US008144815B2

(12) United States Patent
Norris

(10) Patent No.: US 8,144,815 B2
(45) Date of Patent: Mar. 27, 2012

(54) DEMAND-ASSIGNED MULTIPLE ACCESS (DAMA) COMMUNICATION DEVICE AND ASSOCIATED ACQUISITION METHODS

(75) Inventor: James A. Norris, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 1493 days.

(21) Appl. No.: 11/563,903

(22) Filed: Nov. 28, 2006

(65) Prior Publication Data

US 2008/0123779 A1 May 29, 2008

(51) Int. Cl.
*H04L 27/00* (2006.01)
(52) U.S. Cl. ........ 375/324; 329/345; 332/103; 332/112; 340/870.18; 348/726; 370/207; 370/215
(58) Field of Classification Search .................. None
See application file for complete search history.

(56) References Cited

U.S. PATENT DOCUMENTS

| 4,597,107 | A * | 6/1986 | Ready et al. | 455/226.1 |
| 7,443,920 | B2 * | 10/2008 | Thesling et al. | 375/269 |
| 2007/0092018 | A1 * | 4/2007 | Fonseka et al. | 375/265 |

* cited by examiner

*Primary Examiner* — David C. Payne
*Assistant Examiner* — Adolf Dsouza
(74) *Attorney, Agent, or Firm* — Allen, Dyer, Doppelt, Milbrath & Gilchrist, P.A.

(57) ABSTRACT

The communications terminal and acquisition method is for use with Continuous Phase Modulation (CPM) and Phase Shift Keying (PSK) modulation-type signals, each modulation-type signal having a respective preamble phasing sequence. The communications terminal may include a wireless communications device to receive a modulated signal having one of the CPM and PSK modulation types, and having a symbol rate. A controller may be included to cooperate with the wireless communications device to perform a transform process, such as a Fourier Transform (FT) process, on the received modulated signal to detect the modulation type and the symbol rate of the received modulated signal based upon the preamble phasing sequence. Carrier phase and frequency of the received modulated signal may be estimated based upon bin amplitudes. Also, symbol timing may be estimated based upon a phase difference between tones associated with the preamble phasing sequence.

23 Claims, 4 Drawing Sheets

DEMAND-ASSIGNED MULTIPLE ACCESS (DAMA) COMMUNICATION DEVICE AND ASSOCIATED ACQUISITION METHODS

FIELD OF THE INVENTION

The present invention relates to the field of digital communications, and, more particularly, to Demand-Assigned Multiple Access (DAMA) communications and related methods.

BACKGROUND OF THE INVENTION

The new generation of UHF Satellite Communications Standards (MIL-STD-188-181C, MIL-STD-188-182B, and MIL-STD-188-183B) require (up to) 54 different modems to simultaneously reside in the SATCOM terminal. These standards include the DAMA/IW (Demand-Assigned Multiple Access/Integrated Waveform) communications standards which are intended to increase existing satellite communications throughput by a factor of two. Designing the modems for the DAMA/IW standard requires new techniques to combine subfunctions of the modem to reduce software complexity and decrease development and integration time. Indeed, various satellite communication systems may have limited program space, CPU computation speed, and battery power.

In digital communications systems such as cellular and PCS (personal communications systems), computer communications systems, and SATCOM (satellite communications) systems, digital data is modulated by a modem onto a signal to be transmitted over a communications channel. Data is typically encoded before transmission to a receiver or to a storage device, to protect the data from errors which may result from a noisy communications channel or a defect in the storage medium. An encoder manipulates data symbols in accordance with an error correction code and produces error correction symbols or a structured redundancy output sequence. When the code word is later received or retrieved it is decoded to reproduce the data symbols, and errors in the data symbols are corrected, if possible, using the error correction symbols or the structured redundancy of code.

Continuous phase modulation (CPM) is being applied in communications due to its bandwidth efficiency and constant envelope characteristics. With CPM, the modulated signal phase transitions are smoothed. For example, with binary phase shift keying (BPSK) a logic one is transmitted as one phase of a modulated signal and a logic zero is transmitted as a 180-degree shifted phase with a sharp transition in phase. This sharp phase transition results in broadening of the transmitted spectrum. With CPM the phase of the transmitted signal makes smooth phase changes over the bits of the modulating digital signal. An example of CPM is minimum shift keying (MSK) modulation.

Multi-h continuous phase modulation (multi-h CPM) is itself a broad class of modulated waveforms. The class includes signals with constant amplitude but varying phase. Multi-h CPM differs from the single-h format by using a set of H modulation indices in a cyclic manner. This results in delayed merging of neighboring phase trellis paths and ultimately, in improved error performance. A detailed description of multi-h CPM waveforms, is included in the book "Digital Phase Modulation" by Anderson, Aulin, and Sundberg, Plenum Press, New York, 1986.

DAMA is a technique that increases the amount of users that a limited "pool" of satellite transponder space can support. The ability to share bandwidth is based on the theory that not all users will require simultaneous access to communication channels. DAMA systems quickly and transparently assign communication links or circuits based on requests issued from user terminals to a network control system. When the circuit is no longer in use, the channels are immediately returned to the central pool, for reuse by others. By using DAMA, many subscribers can be served using only a fraction of the satellite resources required by dedicated, point-to-point single-channel-per-carrier networks, thus reducing the costs of satellite networking.

Existing MIL-STD-188-183 and 183A terminals require acquisition and demodulation of various Phase Shift Keying (PSK) modulation types, such as Shaped Offset Quadrature Phase Shift Keying (SOQPSK), Differential Encoded Quadrature Phase Shift Keying (DEQPSK), and Binary Phase Shift Keying (BPSK) modulation types. New MIL-STD-188-181C (Integrated Waveform) requires acquisition and demodulation of Continuous Phase Modulation (CPM) types. The specified preamble phasing sequence for each of the modulation types is similar. The required Signal-to-Noise Ratio (SNR) requires advanced signal processing techniques to recover symbol frequency offset, phase offset, and timing.

Existing DAMA terminals and controllers acquire the modulation preamble by predefining the modem baud rate and correlating for the specific modem phasing pattern and start-of-message bit sequence. Baud is a measure of the bit rate, i.e. the number of distinct symbolic changes (signaling event) made to the transmission medium per second in a digitally modulated signal. As each symbol may stand for more than one bit of information, the amount of information sent per second is the product of the rate in baud and the number of bits of information represented by each symbol. The baud rate is equal to the symbol rate times the number of bits per symbol.

Existing DAMA terminals cannot auto baud-detect the modem baud rate (symbol rate). They have to be specifically set up for the expected modulation type and baud rate. Existing DAMA terminals acquire signal parameters in a low SNR conditions. Thus, there is a need for a signal processing approach that can acquire and demodulate both a CPM and PSK modulation type signal in a DAMA communication terminal with increased flexibility.

SUMMARY OF THE INVENTION

In view of the foregoing background, it is therefore an object of the present invention to provide a signal processing approach that can acquire and demodulate both a CPM and PSK modulation type signal in a DAMA communication terminal.

This and other objects, features, and advantages in accordance with the present invention are provided by a communications terminal for use with Continuous Phase Modulation (CPM) and Phase Shift Keying (PSK) modulation-type signals, each modulation-type signal having a respective preamble phasing sequence. The communications terminal may include a wireless communications device, such as a transceiver, to receive a modulated signal having one of the CPM and PSK modulation types, and having a symbol rate. A terminal controller or processor may cooperate with the wireless communications device to perform a transform process, such as a Fourier Transform (FT) process, on the received modulated signal to detect the modulation type (e.g. CPM or PSK) and the symbol rate of the received modulated signal based upon the preamble phasing sequence.

The transform process includes a transformation of input data samples from the time domain to the frequency domain. Furthermore, the FT process preferably be performed to estimate carrier phase, frequency and symbol timing of the received modulated signal based upon the preamble phasing sequence.

A demodulator may be coupled to the wireless communications device to demodulate the received modulated signal based upon the modulation type and symbol rate. The symbol rate may be one of a plurality of expected symbol rates. The wireless communications device may receive the modulated signal at a first sample rate and partition the received modulated signal into a plurality of blocks each including a plurality of samples.

The transform process preferably includes performing a respective transform on blocks of the received modulated signal, the transform containing a plurality of bins that each include a plurality of frequencies. The terminal controller may cooperate with the wireless communications device to perform the transform process on the received modulated signal to estimate the carrier phase and frequency of the received modulated signal based upon bin amplitudes. The terminal controller may also cooperate with the wireless communications device to perform the transform process on the received modulated signal to estimate the symbol timing based upon a phase difference between tones associated with the preamble phasing sequence.

A method aspect of the invention is directed to processing, at a communications terminal, Continuous Phase Modulation (CPM) and Phase Shift Keying (PSK) modulation-type signals, each modulation-type signal having a respective preamble phasing sequence. The method may include receiving a modulated signal having one of the CPM and PSK modulation types, and having a symbol rate, and performing a transform process, such as a Fourier Transform (FT) process, on the received modulated signal to detect the modulation type and the symbol rate of the received modulated signal based upon the preamble phasing sequence. Also, the transform process may be performed to estimate the carrier phase, frequency and symbol timing of the received modulated signal based upon the preamble phasing sequence.

The method may include demodulating the received modulated signal based upon the modulation type and symbol rate. The symbol rate may be one of a plurality of expected symbol rates. The modulated signal may be received at a first sample rate and partitioned into a plurality of blocks each including a plurality of samples. The transform process may include performing a respective transformation on blocks of the received modulated signal, the transforms containing a plurality of bins that each include a plurality of frequencies. The transform process may be performed on the received modulated signal to estimate carrier phase and frequency of the received modulated signal based upon bin amplitudes, and to estimate symbol timing based upon a phase difference between tones associated with the preamble phasing sequence.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 1:
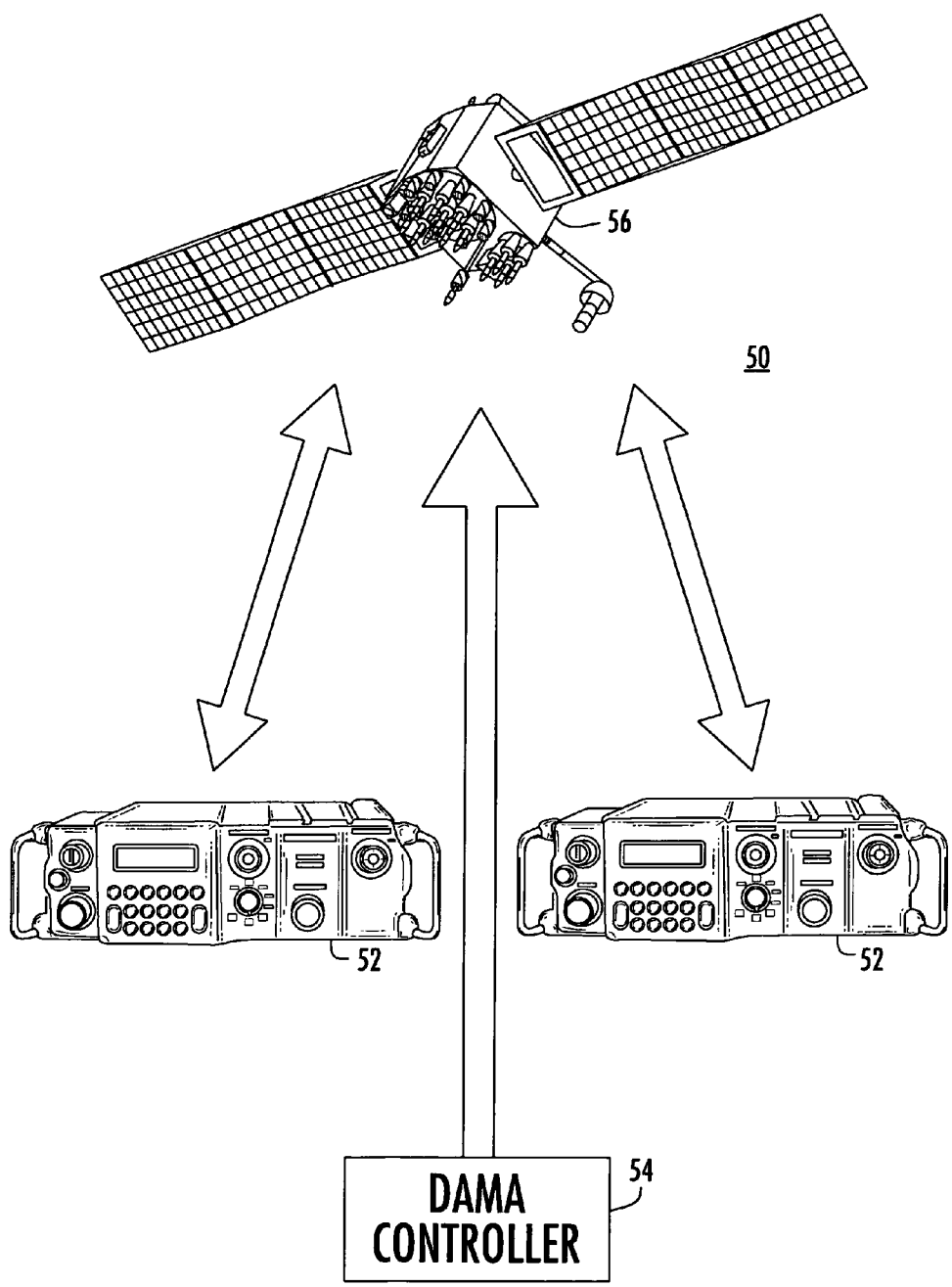
FIG. 1 is a block diagram of an example of a communication system that can be used in accordance with non-limiting examples of the present invention.

For purposes of description, some background information of coding, interleaving, and an exemplary wireless, mobile radio communications system that can be modified for use with the system and method of the present invention is now set forth with regard to FIG. 1. An example of a radio that could be used with such system and method is a Falcon™ III radio manufactured and sold by Harris Corporation of Melbourne, Fla. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

For purposes of description only, a brief description of an example of a Demand Assigned Multiple Access (DAMA) communications system that would benefit from the present invention is described relative to a non-limiting example shown in FIG. 1. This high level diagram of a communications system 50 includes wireless mobile terminals 52 or radios that could be modified for use with the present invention. The wireless mobile terminals 52 communicate and transmit voice or data over a wireless link to a satellite 56 and to other wireless mobile terminals 52. The system 50 is preferably controlled by a DAMA controller 54 as would be appreciated by those skilled in the art.

As discussed above, it is desirable for a DAMA communication system to use Continuous Phase Modulation ("CPM") waveforms and Phase Shift Keyed (PSK) waveforms. These waveforms with an alternating sequence, also referred to herein as a "preamble", have a characteristic frequency spectrum that can be used to determine the modulation type and parameters of the received signal, such as carrier frequency, carrier phase, modulation symbol rate and baud rate. The system and method of the present invention makes use of two or more transforms, such as Fourier Transforms, Discrete Fourier Transforms, and/or Fast Fourier Transforms, to determine the aforementioned parameters.

A CPM or PSK waveform has a frequency spectrum which has a tone at the carrier frequency and characteristic tones which are spaced at the waveform symbol rate divided by 2n. Although this property is known, the present system and method includes an approach for the accurate detection and estimation of either a CPM or PSK preamble.

Use of the Fourier Transform ("FT") or the Laplace Transform ("LT") are methods to convert time domain data to frequency domain data for analysis. The FT has discrete bins which contain the energy as correlated with a frequency offset for each bin. The Fourier Transform may be implemented as a Discrete Fourier Transform ("DFT") or as a Fast Fourier Transform ("FFT").

If the input to a FT is a time domain signal, the output of an FT is a frequency domain signal in a predetermined number of bins. Each bin, by itself, can give an estimate of the frequency and phase of the incoming signal. However, the estimate is typically too inaccurate to allow for accurate parameter estimation. The FT frequency domain output counts the number of cycles of the input time domain waveform. The present invention contemplates the use of any number of bins.

The present system and method makes use of non-contiguous, contiguous, overlapping and/or non-overlapping FTs, from contiguous, non-overlapping samples, to accurately determine the parameters of the received signal. In doing so, the magnitude and phase of the various FT bins are utilized. For example, the phases of the FTs are used to determine frequency of the received signal. The present system and method contemplates the use of two or more FTs.

Figure 2:
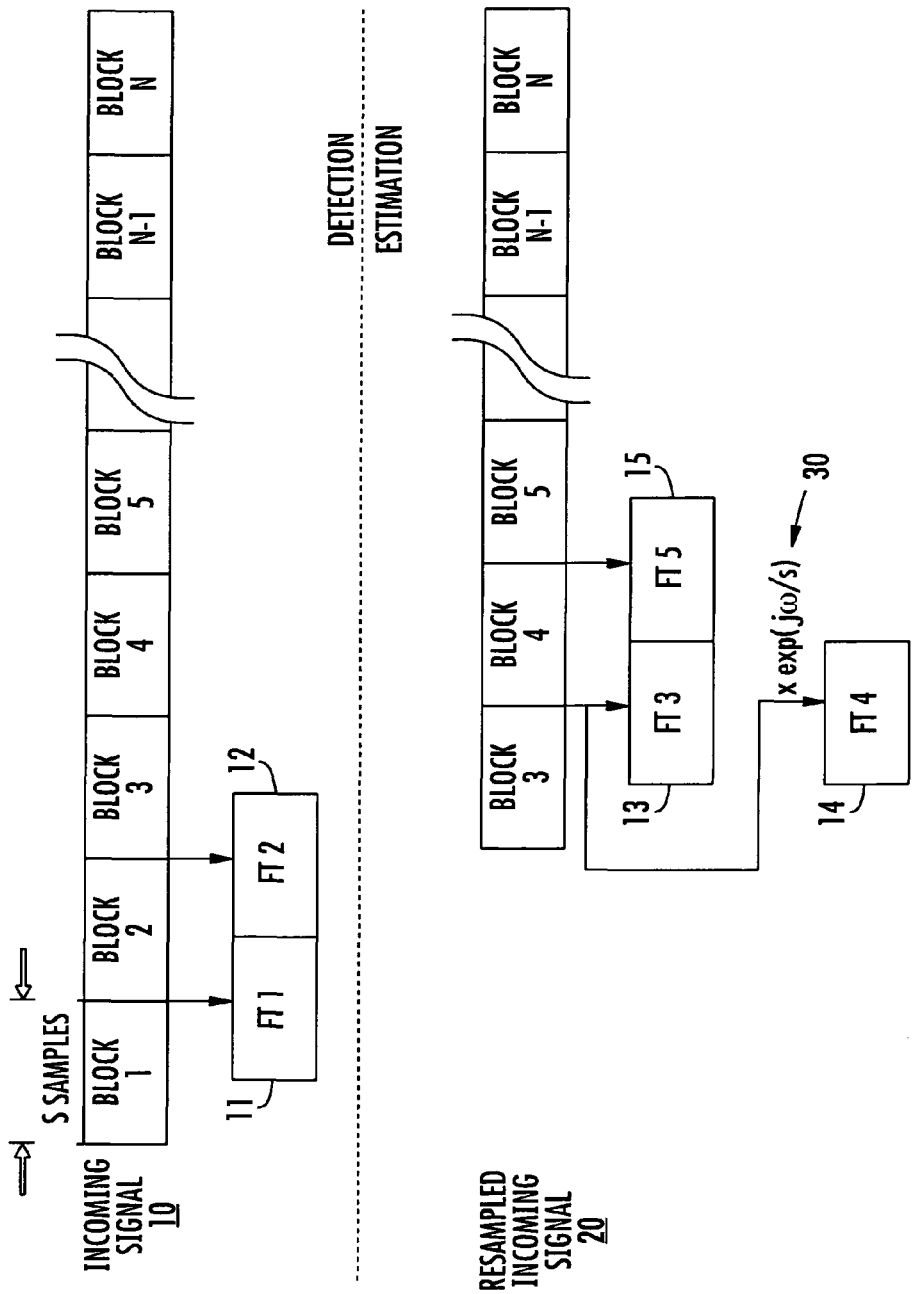
FIG. 2 is a schematic diagram showing an incoming signal divided into blocks and detection/estimation using Fourier Transforms.

With attention now to FIG. 2, an incoming signal 10 is received by the receiver. As used herein, the term "received" means the raw incoming data, at the predetermined sampling rate, enters the processing circuitry at the receiver. The incoming signal may be any CPM or PSK signal with a preamble transmitted over any medium. Specifically, the signal may be a signal on the Military Satellite Communications UHF Frequency band. To detect the incoming signal 10 and determine the characteristics of the signal, the signal is divided into N equal blocks of a predetermined number of samples, as is known by those skilled in the art. One embodiment of the present invention utilizes a block size of 256 samples.

The block of data designated Block 1 may generally be thought of as the block of samples that contain the initial received energy of the incoming CPM or PSK signal. The subsequent blocks are each contiguous with their immediate neighbors. The first Fourier Transform, designated as FT1, is taken on the data Block 1. FT2 then begins with the sample immediately after FT1 ends, so that FT1 and FT2 may be contiguous without any overlap. The information derived from either FT1 or FT2 as well as other known information about the incoming signal, such as maximum allowable carrier offset and maximum symbol rate, are sufficient for detecting the incoming signal 10. A FT may be performed on the other data blocks, but are not shown in FIG. 2 for clarity purposes.

The incoming signal 10, or parts thereof, are resampled to thereby create the resampled incoming signal 20. Typically, data Block 1 and data Block 2, which were used for detection purposes, will be discarded and not be resampled. The resampled rate is typically lower than the sampling rate to ensure adequate sampling of the incoming signal. However, it is contemplated that the resampled rate may also be the same as or faster than the original sampling rate. The FT3 is taken on the resampled data Block 3 and the FT5 is taken on the resampled data Block 4 such that the FT3 and the FT5 are contiguous. A FT may also be performed on the other resampled data blocks, but those FTs are not shown in FIG. 1 for the sake of clarity. The resampled data Block 3 is modified by multiplying by a tone, $\exp(j\omega/s)$ where "$\omega$" is the frequency and "$s$" is the new sample rate, then FT4 is taken on the modified resampled data Block 3. Preferably, the tone shifts the data in resampled Block 3 by ½ the bin spacing, for example. Other bin spacings are contemplated, but shifting by ½ bin spacing allows for the desired amount of resolution as will become apparent in the discussion below.

As discussed in more detail below, the information from the FT3, FT4, and FT5 operations, in addition to the information provided above for detection, allow the characteristics of the incoming signal 10 to be accurately estimated.

Figure 3:
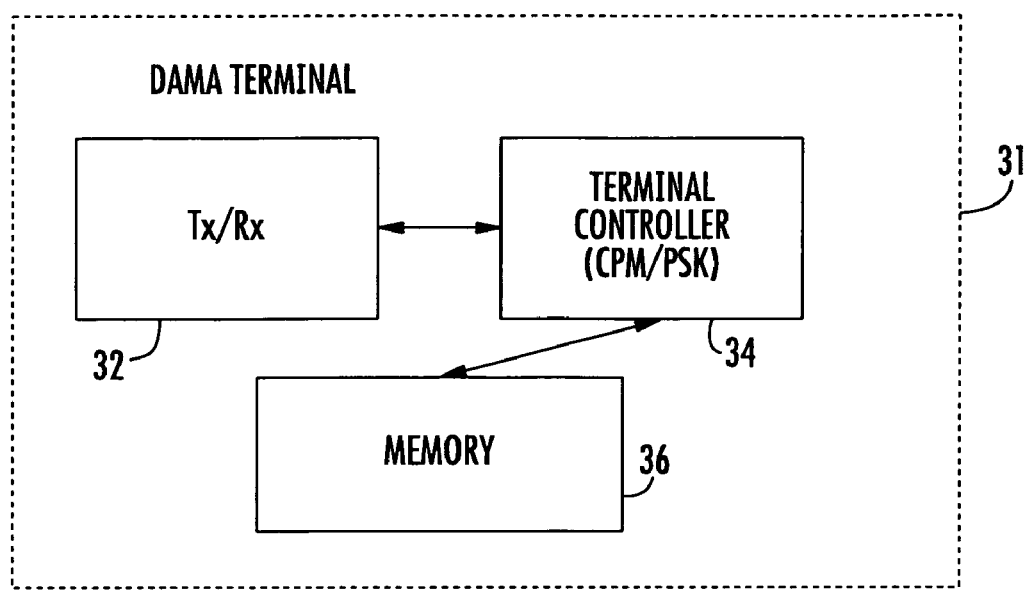
FIG. 3 is a block diagram of an example of a wireless communication terminal in an accordance with a non-limiting example of the present invention.

Referring now to FIG. 3, a DAMA communication terminal 31, e.g. a wireless or mobile terminal, in accordance with the present will now be described. The terminal 31 may be or otherwise include the functionality of a radio, laptop computer, personal digital assistant (PDA) or mobile phone etc. Each terminal 31 may include a communications device 32, a wireless transceiver, to wirelessly and unidirectionally or bidirectionally communicate with other terminals via communication links, and a terminal controller 34 or radio processor to route communications via the communications device 32. Also, a memory 36 may be included as part of the terminal controller 34 or in connection with the terminal controller.

The DAMA communications terminal 31 is for use with Continuous Phase Modulation (CPM) and Phase Shift Keying (PSK) modulation-type signals, each modulation-type signal having a respective preamble phasing sequence. The wireless communications device 32 receives a modulated signal having one of the CPM and PSK modulation types, and having a symbol rate. The terminal controller 34 may cooperate with the wireless communications device 32 to perform a transform process, such as a Fourier Transform (FT) process, on the received modulated signal to detect the modulation type (e.g. CPM or PSK) and the symbol rate of the received modulated signal based upon the preamble phasing sequence. Furthermore, the transform process is preferably performed to estimate carrier phase, frequency and symbol timing of the received modulated signal based upon the preamble phasing sequence, The transform process may be any transformation of input data samples from the time domain to the frequency domain including, for example, Fast Fourier Transforms, Discrete Fourier Transforms and/or the Goertzel Transform.

A demodulator may be part of the terminal controller or coupled to the wireless communications device 32 to demodulate the received modulated signal based upon the modulation type and symbol rate. The symbol rate may be one of a plurality of expected symbol rates. The baud rate is equal to the symbol rate times the number of bits per symbol. The wireless communications device 32 may receive the modulated signal at a first sample rate and partition the received modulated signal into a plurality of blocks each including a plurality of samples, as discussed above with respect to FIG. 2.

The transform process performed by the terminal 31 preferably includes performing a respective transform on blocks of the received modulated signal 10, the transforms containing a plurality of bins that each include a plurality of frequencies. The terminal controller 34 may cooperate with the wireless communications device 32 to perform the transform process on the received modulated signal 10, 20 to estimate the carrier phase and frequency of the received modulated signal based upon bin amplitudes. The terminal controller 34 may also cooperates with the wireless communications device 32 to perform the transform process on the received modulated signal to estimate the symbol timing based upon a phase difference between tones associated with the preamble phasing sequence.

Figure 4:
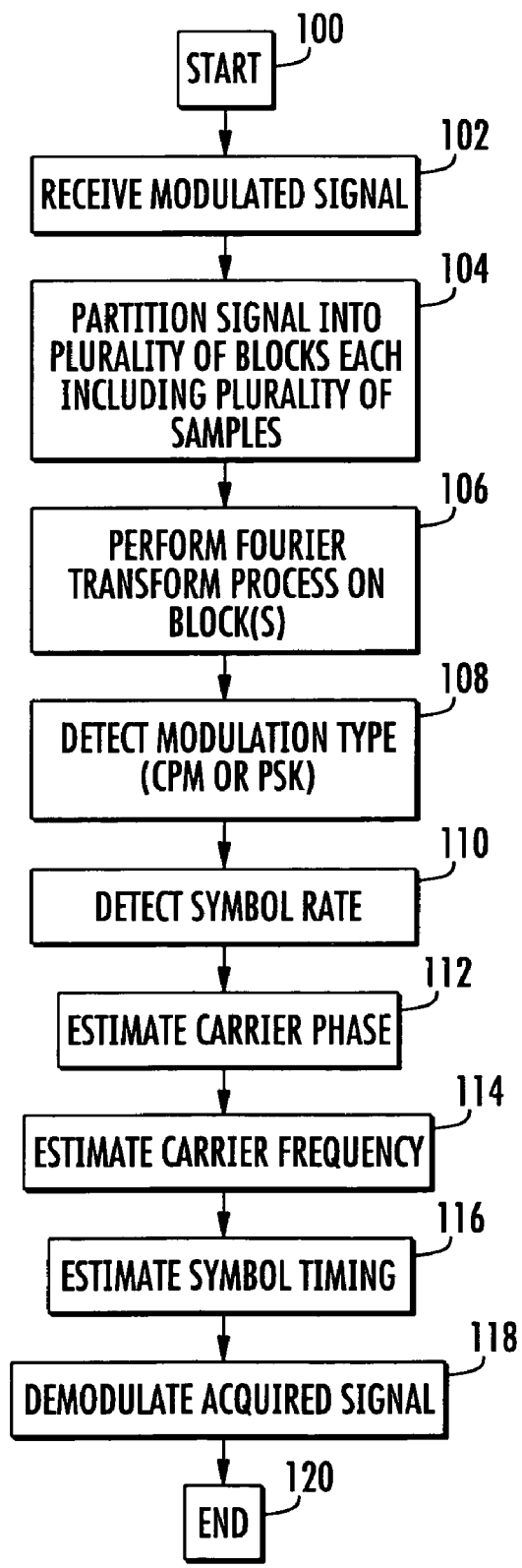
FIG. 4 is a high-level flow chart showing an example of a basic sequence in accordance with one non-limiting example of a method of the present invention.

With reference now to FIG. 4, a flow chart is depicted showing the major steps for detection of a CPM or PSK waveform with a preamble phasing sequence. The method aspect of the invention is directed to processing, at a communications terminal 31, CPM and PSK modulation-type signals, each modulation-type signal having a respective preamble phasing sequence. The method begins at 100 and may include, at 102, receiving a modulated signal having one of the CPM and PSK modulation types, and having a symbol rate. At 106, for example, a Fourier Transform (FT) process on the received modulated signal is performed to detect the modulation type, at 108, and the symbol rate, at 110, of the received modulated signal based upon the preamble phasing sequence. Also, the FT process may be performed to estimate the carrier phase (at 112), frequency (at 114) and symbol timing (at 116) of the received modulated signal based upon the preamble phasing sequence.

At 118, the method may include demodulating the received modulated signal based upon the modulation type and symbol rate, before ending at 120. The symbol rate may be one of a plurality of expected symbol rates. The modulated signal may be received at a first sample rate and partitioned (at 104) into a plurality of blocks each including a plurality of samples. The FT process may include performing a respective FT on blocks of the received modulated signal, the FTs containing a plurality of bins that each include a plurality of frequencies. The FT process may be performed on the received modulated signal to estimate carrier phase (at 112) and frequency (at 114) of the received modulated signal based upon bin amplitudes, and to estimate symbol timing (at 116) based upon a phase difference between tones associated with the preamble phasing sequence.

Furthermore, as part of an example of a method consistent with the features of the present invention, a sample rate may be chosen. Since the symbol rate and maximum allowable carrier offset for the incoming signal is unknown at the time of detection, the sample rate that is chosen must be high enough to allow for (a) the maximum allowable carrier frequency excursion as well as (b) the characteristic tones from the preamble. The tones are typically spaced apart by the baud rate, which for a CPM preamble, is the symbol rate divided by 2n, for example. The CPM used in the MIL-STD-188-181B CPM standard has 2 bits per symbol. For BPSK there is only 1 bit per symbol. For QPSK and 4-ary CPM, there are two bits per symbol, etc. The transmit signal changes every symbol. So, the FT is able to determine the symbol frequency using the sidetones that are transmitted around the carrier. Those tones are generated by the frequency that is transmitted when the signal changes every symbol.

The incoming signal is partitioned into data blocks each containing a predetermined number of samples. One useful partitioning of samples is 256 samples per block, since 256 is a power of 2, although other block sizes are also contemplated by the present invention. As shown in FIG. 2, the incoming signal 10 is partitioned into N blocks of S samples.

The FT bins may be normalized as would be appreciated by those skilled in the art. There can be any number of bins for the FT, consistent with the discussion above for computation intensity and resolution. For a block size of 256 samples/block, a preferable number of FT bins is 256. Alternative numbers of bins are contemplated by the present invention. Therefore, for a sampling rate of 64,000 samples/sec and 256 bins, the bin size, or frequencies (or samples) per bin, is 250. It is preferable, though not required, to choose the sample rate such that the allowable symbol rates for the incoming signal all appear as an exact integer multiple of the bin size, Hz/bin. As would be known to those of skill in the art, the FT used would typically be a complex FT, although other types of FT are also contemplated by the present inventive system and method.

The route-mean-square (RMS) amplitude difference between the samples in a first portion of data Block 1 and the samples in a second portion of data Block 1 is also determined. The first portion of data Block 1 comprises those samples in data Block 1 that are not included in FT1. The second portion of data Block 1 comprises those samples in data Block 1 that are included in FT1. The RMS amplitude difference will be used later as one indication of detection of the incoming signal.

The Tone Bin Distance ("TBD") may also be determined. The TBD is the number of bins between the tones as determined by the baud rate. The TED is approximately equal to the baud rate (samples/sec, or Hz) divided by the bin size (Hz/bin). The TBD will be used, as discussed below, to determine a cumulative amplitude which is used as one indication of detection of the incoming signal. A first FT, FT1 in FIG. 2, is performed on the first data block, Block 1 in FIG. 2, that typically contains the initial energy of the incoming signal. If the signal does not appear in the Block 1, the FT1 is discarded, along with the samples in the Block 1, and the FT2 performs the same operations as FT1. Therefore, Block 1 can be regarded as the block of data within which the incoming signal 10 appears.

The symbol rate may be determined by sorting the bins of FT1 in amplitude order, designating a set of the largest amplitude bins as containing the tones, and determining the closest bin distance (by the difference in bin numbers) between any two of the adjacent tone bins. Typically, the three or five bins with the largest amplitudes are designated as the tones, although other numbers of bins are contemplated. If the determined baud rate is approximately equal to an expected symbol rate divided by 2n, then there is possible signal detection, as will be discussed further below. Once the baud rate is determined, the bandwidth of the incoming signal can be determined by techniques known in the art, and a variable bandwidth filter can be adjusted so as to take advantage of the knowledge of the bandwidth of the incoming signal.

A Carrier Frequency Window ("CFW") may also be determined. The CFW contains a number of bins as a function of the maximum allowable carrier offset. For example, if the maximum allowable carrier offset is +/−1500 Hz, and the bin size (as determined above) is 250 Hz/bin, then a Carrier Bin Offset ("CBO") is 6 bins. The CFW is comprised of the zero bin offset, bin 0, plus those bins that are one CBO greater than and one CBO less than bin 0.

The cumulative amplitude of each bin in the CFW, including the amplitudes of the +/−1 tone for each respective bin, is determined. The use of the amplitudes of just the bins in the CFW may not result in a sufficiently low error rate to be useful. Therefore, the amplitudes of the respective +/−1 tones are added in to allow for a more robust detection. The present invention contemplates determining the cumulative amplitude of the CFW bin and the +/−1 tones as well as determining the cumulative amplitude of the CFW bin and the +/−1 +/−2 tones.

For the CPM preambles (which is binary MSK), the transmit pattern repeats every 4 symbols (1 bit/symbol for MSK). So the tones appear in multiples of the symbol period divided by 4. So, the tones appear at +/−Ts/4, +/−2Ts/4, +/−3Ts/4, etc. For the Legacy DAMA preambles (BPSK and DEQPSK), the transmit pattern repeats every 3 symbols (1 bit per symbol for BPSK, 2 bits per symbol for DEQPSK). So, the tones appear in multiples of the symbol divided by 3—+/−Ts/3, +/−2Ts/3, +−3Ts/3, etc. Note that, for CPM for example, the symbol rate is calculated using the −Ts/4 and Ts/4 tone bins. If there isn't any carrier frequency offset and Ts/4 appears in bin 5, then the −Ts/4 appears in bin −5 (bin 2501 for a 256 pt. FFT). So, the distance between the two is 10. So the symbol rate is equal to the frequency per bin (250 Hz in the example) times 10 divided by 2 times 4 (250*10 *4/2=5 kHz). So, the baud rate isn't exactly known yet, but, since for CPM there is always 2 bits per symbol, the baud rate would be 10 kHz. (Note: an actual example of a CPM baud rate would be 9.6 kbps. The symbol rate is 4.8 ksps. So, for a signal sampled at 64000 samples per second and an FFT size of 256 pts, the actual bin would be 4.8 offset from the carrier. A detection can be formed at this point, but, resampling the signal after detection is preferable. The tone is offset between two bins. If it is resampled to 4 samples per symbol—19200 samples per second—the 4800/4=1200 Hz tone appears in bin 16—an exact distance from the carrier. And, the carrier frequency measurement accuracy is improved—75 Hz per bin rather than 250 Hz. And since the FFT is re-normalized after it is resampled, the noise that was outside of the +/−9600 Hz frequency range is eliminated. This eliminates the effects of adjacent-channel noise and coherent frequency interference).

A determination of whether the incoming signal is detected may be made. For example, to show detection of the signal the baud rate must be equal to approximately a known symbol rate for the incoming signal divided by 2n where n defines the number of symbols in the repeating pattern of the preamble, the FT window does not experience a large change of amplitude as determined by the difference in RMS amplitude, and the largest cumulative amplitude is less than a predetermined threshold. If all three of the above tests are passed, the incoming signal may be determined to have been detected. If any of the above tests are not passed, it may be determined that there is no detection.

The data blocks of the incoming signal, e.g., the incoming signal 10 in FIG. 2, are resampled at a predetermined resampling rate that is preferentially less than the sampling rate chosen earlier. In one embodiment, the blocks of data that are resampled are the last half of the block in which the incoming signal 10 appears and enough of the remaining data blocks after that point for completing the determination of the waveform characteristics of the incoming signal. Typically, this is at least 2 data blocks, as shown in FIG. 2. The resampling rate may be 2n, for example, where n, the symbol repetition factor, is from the aforementioned general equation for the preamble but may be any reasonable rate as contemplated by the invention. The resampling changes the time base of the data in the data blocks.

The resample rate is preferentially a multiple of the signal symbol rate. The tying of the resample rate to a multiple of the symbol rate may have the additional benefit of filtering out out-of-band noise and thus improving the signal-to-noise ratio of the received signal. In some cases, it is not convenient to resample to a sample rate that is less than the original rate. For example, 56 kbps CPM has a 28 ksps symbol rate. So, the characteristic preamble tones appear at multiples of +/−7 kHz. A new sample rate of 56000 samples per second could be chosen (which is less than the original 64000 sps rate), but if it is desired to maintain 4 samples per symbol for all of the resampled signals, then the new sample rate would be 112000 sps.

The steps can be repeated as many times as needed to obtain the data required for determining the characteristics of the incoming signal, as discussed further below.

The bin containing the carrier frequency is determined from the bins of FT3 and FT4. The bin with the largest cumulative amplitude from FT3 and FT4 is the bin that contains the carrier frequency. The center frequency of the bin that contains the carrier frequency is the carrier frequency estimate. The carrier frequency estimate may be refined by determining a phase difference and a frequency offset.

The phase difference is determined between the phase value of the carrier frequency bin and the phase value of the bin from FT5 that has the same bin number as the carrier frequency bin. This phase difference corrects for the FT frequency which is not located at the exact center of the FT bin. The frequency offset is determined by dividing the phase difference by the time duration of one of the FTs. The carrier frequency is determined by adding the frequency offset to the carrier frequency estimate.

The phase and timing of the incoming signal may be determined. The phase of the bins containing the +/−1 tones for the carrier frequency bin is determined. One method of determining the phase is by taking arctan(Q/I) for these bins, although any method for determining phase can be used. A delay offset is determined by calculating the difference in phase between the +/−1 bins and dividing the difference in phase by the bin distance between the +/−1 tones, which may be the same as twice the TBD. The baud rate offset is a timing offset which is used to determine where the FT started with respect to the start of the preamble. The phase of the carrier frequency bin is determined, and a modified phase for the carrier frequency bin is determined by subtracting the delay offset from the phase of the carrier frequency bin. The frequency offset is subtracted from the modified phase for the carrier frequency bin to thereby determine the phase of the incoming signal. The signal level of the incoming signal is determined from the gain values from one of the FT bin normalizing steps. Accordingly, the frequency, phase, and signal level characteristics of the incoming signal are determined.

So, based on the existing MIL-STD-188-181B Continuous Phase Modulation preamble acquisition method, the FFT-based approach of the present invention was designed for the older, legacy PSK modulation types (SOQPSK, DEQPSK, and BPSK). The preamble phasing pattern has characteristic frequencies which can be exploited to acquire the modem preamble in low SNR conditions.

As described above, the frequency offset is the frequency of the center tone (based on FT bin). The phase offset is the phase of center tone. The baud rate is the frequency of one of the two side-tones times the number of bits that are repeated in the PSK preamble. For example, if the side-tone is at 2400 Hz and the preamble phasing pattern repeats every 4 bits (110011001100 . . . ) then the symbol rate of the received modulation is 9600 symbols per second. The timing offset is the inverse tangent on phase of one of the side tones.

The new MIL-STD-188-181C, MIL-STD-188-183B and MIL-STD-188-182B (Integrated Waveform, SATCOM) standards combine both CPM and PSK modulation types. The ability to acquire and demodulate both types of signals in the same receiver is a new SATCOM requirement. Typical approaches use existing correlation demodulation while the FT-based approach of the present invention will allow the receiver increased flexibility and reduce development, integration, and testing time. The FT-based approach also improves SNR performance of existing DAMA (pre-IW) modulation types.

Furthermore, an issue with the FT implementation is that any frequency which is not an exact integer multiple of the data sample rate divided by the number of FT bins ends up with energy split between two adjacent bins of the FT. This effect tends to hide the characteristic PSK tones in the surrounding noise. The present inventive system and method addresses this issue by multiplying the input data by a constant tone which may correspond to exactly ½ bin frequency, or some other fraction of bin frequency, and then performing another FT on the input data that has been multiplied by the constant tone and comparing the results with the results of the FT performed on the non-multiplied input data. The procedure creates two FT's on the same time-domain data. In one case, the carrier frequency will be located more closely to the center of an FT bin. In the other case, the carrier frequency will be located closer to the edge of the bin which may cause energy spillover into the next, adjacent FT bin. This energy spillover is undesired because it reduces the apparent signal strength in relation to the noise energy.

The worst case situation occurs when tone appears exactly on a bin edge. In this case, the tone energy will be equally distributed between the two adjacent FT bins. For the single bin of interest (the transmitted carrier frequency), the apparent signal to noise ratio is 3 dB (a power ratio of 2) less than the signal to noise ratio which would be apparent if the FT was modified to locate the transmit carrier tone at the center of an FT bin. With two candidate FT's, choosing the transmit carrier frequency which has the highest magnitude will provide the best possible representation of the transmitted signal (in the frequency domain). This will improve the apparent signal to noise ratio which will improve the signal estimation performance in noisy environments.

The present system and method may separate the detection and estimation functions. During detection, the symbol rate is detected as a first estimated parameter which is then utilized by the receiver for tailoring the signal sample rate and bandwidth to better match the incoming signal before calculating the transmitted carrier frequency, phase, and bit timing. The signal to noise ratio improvement which results from the tailoring process (of resampling and filtering) consequently improves the accuracy of the calculated values.

Additionally, the present system and method performs a symbol rate calculation by sorting the FT tones in order of amplitude and measuring the bin distance between the closest two tones. The symbol rate is calculated as the distance between the closest two characteristic +/−Ts/4 preamble/modulation tones. The expected value of the two closest tones is equal to the symbol rate divided by 2n where "n" is the number of bit repeats in the preamble from the signal preamble. This baud rate calculation greatly improves the baud rate estimation because the inventive method takes advantage of the large signal to noise ratio apparent in a FT bin that contains a large signal level. The conventional correlation method integrates the noise in the entire range of frequencies which cover the transmit carrier frequency and the tones and results in a more intensive correlation function. The sorting method used by the present invention excludes energy in those bins which do not contain enough signal energy to cause a signal detection. Therefore, the present invention excludes the noise from the baud rate estimation calculation as will become apparent in the detailed description below.

A non-limiting example of a signal acquisition approach is described. The detection and estimation portions of the algorithm are separated into two sections as follows:

Detection

1. Since the symbol rate is unknown at the time of detection, the sample rate chosen for detection must be high enough to allow for the maximum allowable carrier frequency excursion and include the characteristic tones at 3*symbol_rate 4. For waveforms in the range of 4800 to 28000 symbols per second and a +/−1500 Hz allowable carrier frequency offset, a 64000 samples per second rate will provide a good initial frequency estimate (discussed in detail in the ESTIMATION section). For a 256 point FFT at 64000 samples per second, the Hz/Bin is 250. A carrier frequency offset of 1500 Hz would correspond to bin 6 of the FFT and a symbol rate of 28000 Hz would have characteristic tones at bins 28, 56, and 84. It is preferable that a sample rate is chosen such that the allowable symbol rates all appear as an exact integer multiple of the Hz/Bin value.
2. The next step is to alternate FFT windows at ½ the FFT Size. For a 256 point FFT, the windows would be 128 samples apart. This would allow for an impulse in the middle of an FFT (due to the start of a preamble) to be discarded.
3. For each FFT window, normalize the entire window such that the sum of all the samples divided by the FFT size is equal to 1.0.
4. Perform the FFT.
5. Sort the 5 highest tones in order of magnitude and confirm that the closest two tones (in bin distance) are equal to an expected symbol rate. Note that this FET Window will not have an exact integer multiple of symbols. This limitation will cause the +/−1 MSK Tones to vary in amplitude in relation to each other and the carrier (although the total energy in the FFT Window will always be the same independent of the starting point of the preamble in the FFT Window).
6. Pick the bin with the closest two tones that match the expected symbol rate, and, the FFT window does not have a unit step increase in amplitude, and the sum of the energy is greater than a minimum value. Include adjacent bins for all of the tones in case the carrier frequency is located at the bin edge.
7. If the closest two tones in the FFT match an expected symbol rate, the FFT Window does not have a large change in amplitude, the sum of the energy in the FFT is greater than a minimal value, and the sum of the Carrier tone and the +/−1 and +/−2 characteristic tones is greater than 0.0183, then a detection has occurred. The next step is to perform the Phase, Frequency, and Timing Estimation.

Estimation

1. Use the last ½ Detection Window Input Samples as the first set of samples for Estimation. The incoming samples are resampled to achieve 4 samples per symbol.
2. Normalize the buffer.
3. Perform FFT.
4. Take the same data, multiply by a tone with the value equal to ½ bin spacing and perform an FFT.
5. Perform steps 1-3 for third FFT.
6. Find the bin containing the center frequency of the Preamble (Bin with highest amplitude).
7. Calculate exact frequency by subtracting the phase of the center bin of the first FFT from the phase of the center bin of the third FET and dividing by the time duration of one FFT. This is accomplished in two parts:
   7.1. Fine Resolution—The subtraction of the two phases is ambiguous for frequency offset values which are greater than 1 FFT Bin. So the subtraction provides +/−½ Bin resolution which must be added to.
   7.2. Coarse Resolution—The actual bin which has the highest peak value of the FFT spectrum.
8. Calculate delay offset using the +/−1 Tones of the first set of FFT data for the FFT with a center frequency which falls closest to the center of the bin. This is decided by using the FFT (of the first two FFT's) with the highest amplitude of the center frequency. Subtract the phase of the two tones and divide by the distance between the two tones.
9. Calculate the Center Phase using the phase of the center bin of the first FFT and subtracting off the phase caused by timing delay, then subtract off the phase caused by the frequency offset,
10. The gain value of the waveform is the last gain value calculated in the normalization function.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications terminal for use with Continuous Phase Modulation (CPM) and Phase Shift Keying (PSK) modulation-type signals, each modulation-type signal having a respective preamble phasing sequence, the communications terminal comprising:
   a wireless communications device to receive a modulated signal having one of the CPM and PSK modulation types, and having a symbol rate; and
   a terminal controller cooperating with said wireless communications device to perform a transform process on the received modulated signal to convert the received modulated signal to frequency domain and detect the modulation type and the symbol rate of the received modulated signal based upon the preamble phasing sequence.

2. The communications terminal of claim 1 wherein said wireless communications device comprises a wireless transceiver.

3. The communications terminal of claim 1 further comprising a demodulator coupled to said wireless communications device to demodulate the received modulated signal based upon the modulation type and symbol rate.

4. The communications terminal of claim 1 wherein the symbol rate is one of a plurality of expected symbol rates.

5. The communications terminal of claim 1 wherein the wireless communications device receives the modulated signal at a first sample rate and partitions the received modulated signal into a plurality of blocks each including a plurality of samples.

6. The communications terminal of claim 5 wherein the transform process includes performing a respective transform on blocks of the received modulated signal, the transforms containing a plurality of bins that each include a plurality of frequencies.

7. The communications terminal of claim 6 wherein said controller cooperates with said wireless communications device to perform the transform process on the received modulated signal to estimate carrier phase and frequency of the received modulated signal based upon bin amplitudes.

8. The communications terminal of claim 7 wherein said terminal controller cooperates with said wireless communications device to perform the transform process on the received modulated signal to estimate symbol timing based upon a phase difference between tones associated with the preamble phasing sequence.

9. A communications terminal for use with Continuous Phase Modulation (CPM) and Phase Shift Keying (PSK) modulation-type signals, each modulation-type signal having a respective preamble phasing sequence, the communications terminal comprising:
   a wireless communications device to receive a modulated signal having one of the CPM and PSK modulation types, and having a symbol rate; and
   a terminal controller cooperating with said wireless communications device to perform a transform process on the received modulated signal to convert the received modulated signal to frequency domain and detect the modulation type and the symbol rate of the received modulated signal, and to estimate carrier phase, frequency and symbol timing of the received modulated signal based upon the preamble phasing sequence.

10. The communications terminal of claim 9 wherein said wireless communications device comprises a wireless transceiver.

11. The communications terminal of claim 9 further comprising a demodulator coupled to said wireless communications device to demodulate the received modulated signal based upon the modulation type and symbol rate.

12. The communications terminal of claim 9 wherein the symbol rate is one of a plurality of expected symbol rates.

13. The communications terminal of claim 9 wherein the wireless communications device receives the modulated signal at a first sample rate and partitions the received modulated signal into a plurality of blocks each including a plurality of samples.

14. The communications terminal of claim 13 wherein the transform process includes performing a respective transform on blocks of the received modulated signal, the transforms containing a plurality of bins that each include a plurality of frequencies.

15. The communications terminal of claim 14 wherein said terminal controller cooperates with said wireless communications device to perform the transform process on the received modulated signal to estimate the carrier phase and frequency of the received modulated signal based upon bin amplitudes.

16. The communications terminal of claim 15 wherein said terminal controller cooperates with said wireless communications device to perform the FT process on the received modulated signal to estimate the symbol timing based upon a phase difference between tones associated with the preamble phasing sequence.

17. A method of processing, at a communications terminal, Continuous Phase Modulation (CPM) and Phase Shift Keying (PSK) modulation-type signals, each modulation-type signal having a respective preamble phasing sequence, the method comprising:
   receiving a modulated signal having one of the CPM and PSK modulation types, and having a symbol rate; and
   performing a transform process on the received modulated signal to convert the received modulated signal to frequency domain and detect the modulation type and the symbol rate of the received modulated signal based upon the preamble phasing sequence.

18. The method of claim 17 further comprising demodulating the received modulated signal based upon the modulation type and symbol rate.

19. The method of claim 17 wherein the symbol rate is one of a plurality of expected symbol rates.

20. The method of claim 17 wherein the modulated signal is received at a first sample rate and partitioned into a plurality of blocks each including a plurality of samples.

21. The method of claim 20 wherein the transform process includes performing a respective transform on blocks of the received modulated signal, the transforms containing a plurality of bins that each include a plurality of frequencies.

22. The method of claim 21 wherein the transform process is performed on the received modulated signal to estimate carrier phase and frequency of the received modulated signal based upon bin amplitudes.

23. The method of claim 22 wherein the transform process is performed on the received modulated signal to estimate symbol timing based upon a phase difference between tones associated with the preamble phasing sequence.

* * * * *